United States Patent
Asada

(10) Patent No.: US 12,440,937 B2
(45) Date of Patent: Oct. 14, 2025

(54) MEASUREMENT DEVICE, ADDITIVE MANUFACTURING SYSTEM, AND CUTTING MACHINING SYSTEM

(71) Applicant: Mitsubishi Electric Corporation, Tokyo (JP)

(72) Inventor: Shigenobu Asada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 86 days.

(21) Appl. No.: 18/294,188

(22) PCT Filed: Aug. 10, 2021

(86) PCT No.: PCT/JP2021/029486
§ 371 (c)(1),
(2) Date: Feb. 1, 2024

(87) PCT Pub. No.: WO2023/017557
PCT Pub. Date: Feb. 16, 2023

(65) Prior Publication Data
US 2025/0091172 A1    Mar. 20, 2025

(51) Int. Cl.
*B23Q 17/24* (2006.01)
*B29C 64/379* (2017.01)
(Continued)

(52) U.S. Cl.
CPC ........ *B23Q 17/2471* (2013.01); *B29C 64/379* (2017.08); *B29C 64/393* (2017.08);
(Continued)

(58) Field of Classification Search
CPC .. B23Q 17/2471; B29C 64/379; B29C 64/393
See application file for complete search history.

(56) References Cited

U.S. PATENT DOCUMENTS

| 2018/0143611 A1 | 5/2018 | Wenke et al. |
| 2020/0254558 A1 | 8/2020 | Oshima |

FOREIGN PATENT DOCUMENTS

| JP | 2008-292430 A | 12/2008 |
| JP | 2010-256276 A | 11/2010 |

(Continued)

OTHER PUBLICATIONS

Office Action issued Sep. 17, 2024 in Japanese Patent Application No. 2023-541145 with English machine translation thereof.

(Continued)

*Primary Examiner* — James Sanders
(74) *Attorney, Agent, or Firm* — XSENSUS LLP

(57) ABSTRACT

A measurement device includes: a sensor that acquires image information by imaging an object targeted for addition of materials or cutting; a measurement unit that acquires measurement data by measuring the shape of the object on the basis of the image information, the measurement data representing a shape of the object; a missing region detecting unit that detects a missing region of the object; a measurement data complementing unit that acquires re-measurement data by re-measuring the shape of the object on the basis of the image information which the sensor has acquired by re-imaging, and complements the measurement data with the re-measurement data; and a machining region specifying unit that specifies a machining region for the addition or the cutting, on the basis of the complemented measurement data and a model of a finished product obtained by the addition or the cutting.

15 Claims, 13 Drawing Sheets

(51) Int. Cl.
  *B29C 64/393*   (2017.01)
  *B33Y 30/00*    (2015.01)
  *B33Y 40/00*    (2020.01)
  *B33Y 40/20*    (2020.01)
  *B33Y 50/02*    (2015.01)

(52) U.S. Cl.
  CPC ............... *B33Y 30/00* (2014.12); *B33Y 40/00* (2014.12); *B33Y 40/20* (2020.01); *B33Y 50/02* (2014.12)

(56) References Cited

FOREIGN PATENT DOCUMENTS

| | | | |
|---|---|---|---|
| JP | 2013-200151 | A | 10/2013 |
| JP | 2014-102243 | A | 6/2014 |
| JP | 2015-068654 | A | 4/2015 |
| JP | 2015-190818 | A | 11/2015 |
| JP | 2017-134050 | A | 8/2017 |
| JP | 2018-516178 | A | 6/2018 |
| JP | 2018-169799 | A | 11/2018 |
| JP | 2019-207140 | A | 12/2019 |
| JP | 2020-055273 | A | 4/2020 |
| JP | 2020-066038 | A | 4/2020 |

OTHER PUBLICATIONS

International Search Report and Written Opinion mailed on Nov. 2, 2021, received for PCT Application PCT/JP2021/029486, filed on Aug. 10, 2021, 8 pages including English Translation.

MEASUREMENT DEVICE, ADDITIVE MANUFACTURING SYSTEM, AND CUTTING MACHINING SYSTEM

CROSS-REFERENCE TO RELATED APPLICATION

This application is a national stage application, pursuant to 35 U.S.C. § 371, of International Patent Application No. PCT/JP2021/029486, filed Aug. 10, 2021, the entire contents of which are incorporated herein by reference.

FIELD

The present disclosure relates to a measurement device that measures an object targeted for addition of materials or cutting, an additive manufacturing system, and a cutting machining system.

BACKGROUND

In machining an object by adding materials to an object or by cutting the object, the shape of the object is measured to thereby specify an object machining region for the addition or cutting. In order to specify the machining region, three-dimensional measurement data on the object is required.

Patent Literature 1, which relates to a machining apparatus for machining a tool by removing materials, discloses that, when the machining apparatus re-machines a used damaged tool, a measurement unit of the machining apparatus performs three-dimensional measurement of a contour of the tool, using a sensor to obtain three-dimensional measurement data on the tool. On the basis of a difference between a preset reference contour and a tool model formed on the basis of the three-dimensional measurement data, the measurement unit specifies a tool machining region from which to remove materials.

CITATION LIST

Patent Literature

Patent Literature 1: Japanese Translation of PCT International Application Laid-open No. 2018-516178

SUMMARY OF INVENTION

Problem to be Solved by the Invention

The measurement for specifying the machining region may be unsuccessful because a blind spot can appear depending on the shape or size of an object in detecting the shape of the object. Such unsuccessful measurement, which is a "missing" measurement, makes it difficult to accurately specify the machining region. The technique of Patent Literature 1 does not take into account the missing measurement due to the blind spot, and thus poses a problem of difficulty in accurately specifying the machining region, depending on the object.

The present disclosure has been made in view of the above, and an object of the present disclosure is to provide a measurement device capable of accurately specifying a machining region for addition or cutting in adding materials to an object or cutting the object.

Means to Solve the Problem

To solve the above problem and achieve the object, a measurement device according to the present disclosure comprises: a sensor to acquire image information by imaging an object targeted for addition of materials or cutting; a measurement unit to acquire measurement data by measuring the shape of the object on the basis of the image information, the measurement data representing a shape of the object; a missing region detecting unit to detect a missing region of the object, the missing region being a region lacking the measurement data; a measurement data complementing unit to acquire re-measurement data, which is measurement data about the missing region, by re-measuring the shape of the object on the basis of the image information which the sensor has acquired by re-imaging, and complement the measurement data with the re-measurement data; and a machining region specifying unit to specify a machining region for the addition or the cutting, on the basis of the complemented measurement data and a model of a finished product obtained by the addition or the cutting.

Effects of the Invention

The measurement device according to the present disclosure has an effect of accurately specifying the machining region for the addition or the cutting, in adding the materials to the object or cutting the object.

DESCRIPTION OF EMBODIMENTS

A measurement device, an additive manufacturing system, and a cutting machining system according to embodiments will be hereinafter described in detail with reference to the drawings.

First Embodiment

Figure 1:
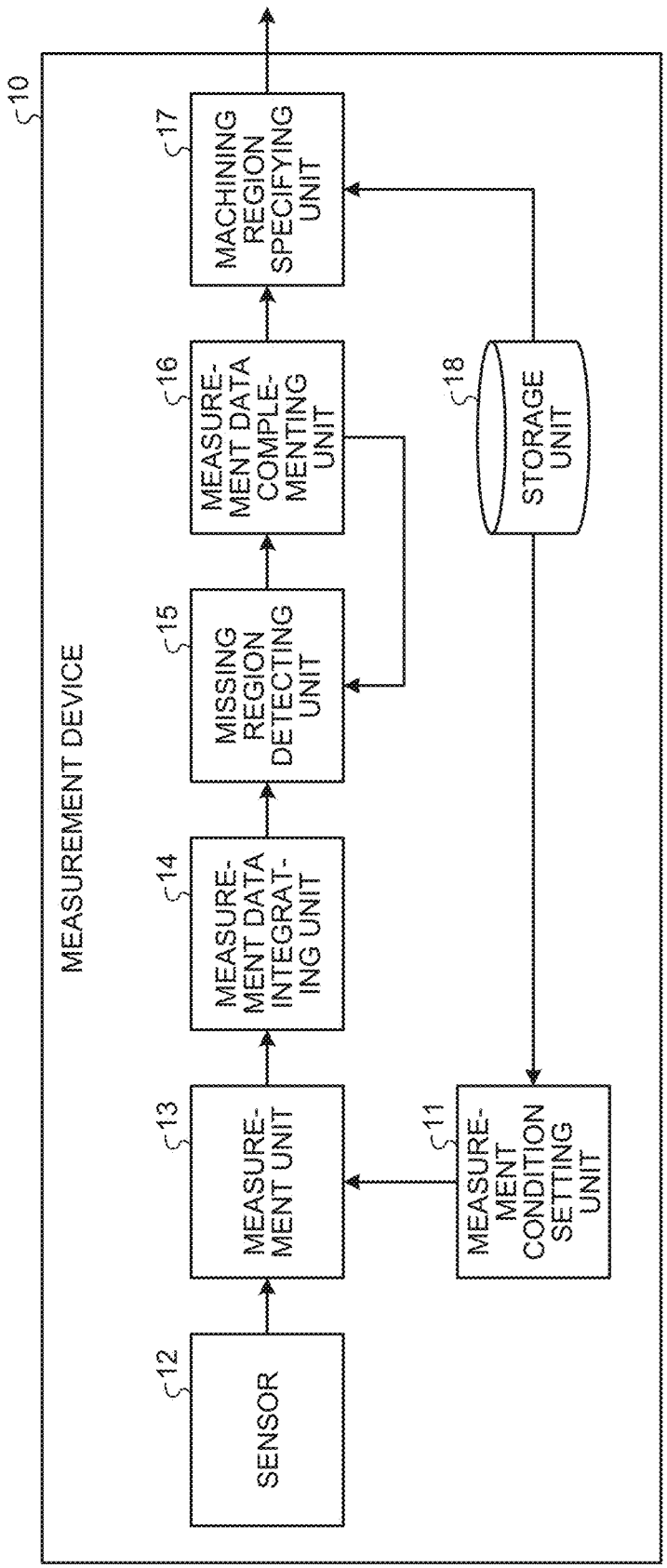
FIG. 1 is a diagram illustrating a functional configuration of a measurement device according to a first embodiment.

FIG. 1 is a diagram illustrating a functional configuration of a measurement device 10 according to a first embodiment. The measurement device 10 measures the shape of an object to thereby specify a machining region of the object. The object is targeted for addition of materials thereto or cutting. The machining region of the object is a region for the addition of materials or the cutting. The machining region to which to add materials is hereinafter referred to as an addition region. The machining region to be cut is hereinafter referred to as a cutting region.

The measurement device 10 includes a measurement condition setting unit 11 a sensor 12, a measurement unit 13, and a storage unit 18. The measurement condition setting unit 11 sets measurement conditions. The sensor 12 images the object. The measurement unit 13 measures the shape of the object. The storage unit 18 stores various types of information. The measurement device 10 further includes a measurement data integrating unit 14, a missing region detecting unit 15, a measurement data complementing unit 16, and a machining region specifying unit 17.

The sensor 12 acquires image information by imaging the object. The sensor 12 is a 2D camera or a 3D sensor. The image information acquired by the sensor 12 is 2D data such as a grayscale image or a color image, or 3D data such as three-dimensional point cloud data or a range image. The sensor 12 may be, for example, two 2D laser scanners. The 3D data can be acquired by the two 2D laser scanners disposed crosswise relative to each other. The two 2D laser scanners disposed crosswise relative to each other are defined as the two 2D laser scanners disposed such that a scanning plane of one of the 2D laser scanners and a scanning plane of the other one of the 2D laser scanners are orthogonal to each other. The following description is based on the assumption that the measurement device 10 acquires the 3D data and measures the object.

The measurement condition setting unit 11 sets the measurement conditions for measurement by the measurement unit 13. The measurement conditions include a placeable range, a measurement distance, an observation angle, and an exposure time. The placeable range is a range in which the object and the sensor 12 can be placed in acquiring the image information. The measurement distance is a distance from the object to the sensor 12. The observation angle is an angle representing a direction of the sensor 12 with respect to the object. The exposure time is an exposure time of the sensor 12 at the time of imaging. The measurement condition setting unit 11 sets the measurement conditions in accordance with a state of the object. Note that the measurement conditions are not limited to those described in the first embodiment. The measurement conditions can be any conditions that are necessary for measurement.

The measurement condition setting unit 11 sets the measurement conditions by actually measuring the object using the sensor 12. Alternatively, the measurement condition setting unit 11 sets the measurement conditions by simulation. When setting the measurement conditions by simulation, the measurement condition setting unit 11 places the sensor 12 and the object in a virtual space and simulates a scene where the sensor 12 images the object, thereby setting the measurement conditions. The measurement condition setting unit 11 reads a first reference model representing the shape of the object from the storage unit 18 and places the first reference model in the virtual space. The storage unit 18 stores the first reference model in advance.

The measurement unit 13 acquires measurement data by measuring the shape of the object on the basis of the image information. The measurement data represents the shape of the object. The measurement data is 2D data or 3D data. The object is placed on, for example, a rotary stage rotatable about an A axis and a B axis as well. The A axis and the B axis are two axes of rotation perpendicular to each other.

The measurement unit 13 changes the posture of the object by rotating the object using the rotary stage. The measurement unit 13 measures the shape of the object by allowing the sensor 12 to image the object, changing the posture of the object. The measurement unit 13 automatically measures the object when a controller such as a numerical controller controls the rotary stage in cooperation with the sensor 12.

The measurement unit 13 measures the shape of the object by changing a position of the object relative to the sensor 12 or a posture of the object relative to the sensor 12. That is, the measurement unit 13 measures the object by changing at least one of the position of the object, the posture of the object, the position of the sensor 12, and the posture of the sensor 12. A direction in which to change the position of the object and a direction in which to change the position of the sensor 12 can be any direction among an X axis direction, a Y axis direction, and a Z axis direction. The X axis, the Y axis, and the Z axis are three axes perpendicular to one another.

The object can be held by an arm of a robot and rotated by a movement of the arm. Alternatively, the sensor 12 can be attached to an arm of a robot, and the position or posture of the sensor 12 can be changed by a movement of the arm. The device that changes at least one of the position of the object, the posture of the object, the position of the sensor 12, and the posture of the sensor 12 is not limited to the rotary stage or the robot, but can be another device.

The measurement data integrating unit 14 integrates the measurement data which the measurement unit 13 has acquired at different timings. For example, the measurement data integrating unit 14 calculates a center position of the rotary stage and integrates the measurement data obtained on the basis of the center position. When the measurement data acquired by the measurement unit 13 includes unnecessary data such as data about a background of the object, the measurement data integrating unit 14 can delete the unnecessary background data, using a background subtraction method. Accordingly, the measurement data integrating unit 14 can integrate only the measurement data about the object.

The missing region detecting unit 15 detects a missing region on the basis of the measurement data integrated by the measurement data integrating unit 14. The missing region, which is a region of the object, lacks the measurement data. Depending on the shape or size of the object, missing measurement may occur due to a blind spot of the sensor 12. The measurement data is lost due to the missing measurement.

For example, the missing region detecting unit 15 extracts a contour of the object from the measurement data and compares the extracted contour with a contour of a second reference model, thereby detecting the missing region. The measurement data is three-dimensional point cloud data. The second reference model is a model of a finished product obtained by addition or cutting. The second reference model is set in the measurement device 10 in advance. The missing region detecting unit 15 can perform statistical processing on the three-dimensional point cloud data and detect the missing region on the basis of a statistical value.

The measurement data complementing unit 16 acquires re-measurement data which is the measurement data about the missing region, by re-measuring the shape of the object on the basis of the image information which the sensor 12 has acquired by re-imaging. The measurement data complementing unit 16 complements the measurement data with the re-measurement data. In a case where the missing region detecting unit 15 detects the missing region to thereby determine the position of the missing region or the posture of the object having the missing region facing the sensor 12, the measurement data complementing unit 16 can change the position or posture of the object in accordance with the determined position or posture and perform the re-measurement. The measurement data complementing unit 16 can perform the re-measurement with more variations in the position or posture of the object than when the measurement unit 13 performs the measurement. The measurement data complementing unit 16 can perform the re-measurement with more variations in the position or posture of the sensor 12 than when the measurement unit 13 performs the measurement.

The missing region detecting unit 15 confirms that there is no missing region in the measurement data complemented by the measurement data complementing unit 16. When the missing region detecting unit 15 detects the missing region again, the measurement data complementing unit 16 performs the re-measurement again and complements the measurement data. Upon confirmation that there is no missing region, the measurement data complementing unit 16 outputs the measurement data.

The machining region specifying unit 17 specifies the addition region or the cutting region as the machining region on the basis of the second reference model and the complemented measurement data. The second reference model is stored in advance in the storage unit 18. The second reference model is a three-dimensional model or a two-dimensional model. The machining region specifying unit 17 compares the second reference model read from the storage unit 18 with the measurement data.

In specifying the addition region, the machining region specifying unit 17 superimposes the measurement data on the second reference model to specify a region that exists in the second reference model but does not exist in the measurement data, the specified region being defined as the addition region. In specifying the cutting region, the machining region specifying unit 17 superimposes the measurement data on the second reference model to specify a region that exists in the measurement data but does not exist in the second reference model, the specified region being defined as the cutting region. The machining region specifying unit 17 can specify the addition region or the cutting region by another method.

Figure 2:
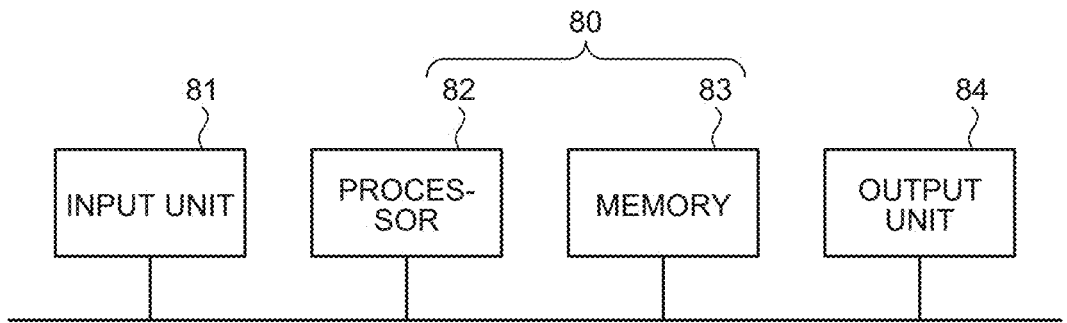
FIG. 2 is a diagram illustrating an example of a hardware configuration for implementing a processing unit of the measurement device according to the first embodiment.

Next, a hardware configuration for implementing the processing unit of the measurement device 10 will be described. FIG. 2 is a diagram illustrating an example of the hardware configuration for implementing the processing unit of the measurement device 10 according to the first embodiment. The measurement condition setting unit 11, the measurement unit 13, the measurement data integrating unit 14, the missing region detecting unit 15, the measurement data complementing unit 16, and the machining region specifying unit 17 that are the processing unit of the measurement device 10 are implemented by the use of processing circuitry 80. The processing circuitry 80 includes a processor 82 and a memory 83.

The processor 82 is a central processing unit (CPU). The processor 82 may be an arithmetic unit, a microprocessor, a microcomputer, or a digital signal processor (DSP). The memory 83 includes, for example, a random access memory (RAM), a read only memory (ROM), a flash memory, an erasable programmable read only memory (EPROM), an electrically erasable programmable read only memory (EEPROM (registered trademark)), or the like.

The memory 83 stores a program for operating as the processing unit of the measurement device 10. The processing circuitry 80 can implement the functions of the processing unit by the processor 82 reading and executing the program. An input unit 81 is a circuit that receives an input signal to the processing unit of the measurement device 10. The input unit 81 receives the image information from the sensor 12. An output unit 84 is a circuit that outputs a signal generated by the processing unit of the measurement device 10. The output unit 84 outputs data indicating a specified machining region.

The configuration illustrated in FIG. 2 is an example of the hardware in the case where the processing unit of the measurement device 10 is implemented by the processor 82 and the memory 83 that are for general purpose use, but the processing unit of the measurement device 10 may be implemented by dedicated processing circuitry instead of the processor 82 and the memory 83. The dedicated processing circuitry is a single circuit, a complex circuit, an application specific integrated circuit (ASIC), a field programmable gate array (FPGA), or a circuit obtained by a combination thereof. Note that some of the processing unit may be implemented by the processor 82 and the memory 83, and the rest of the processing unit may be implemented by the dedicated processing circuitry.

Figure 3:
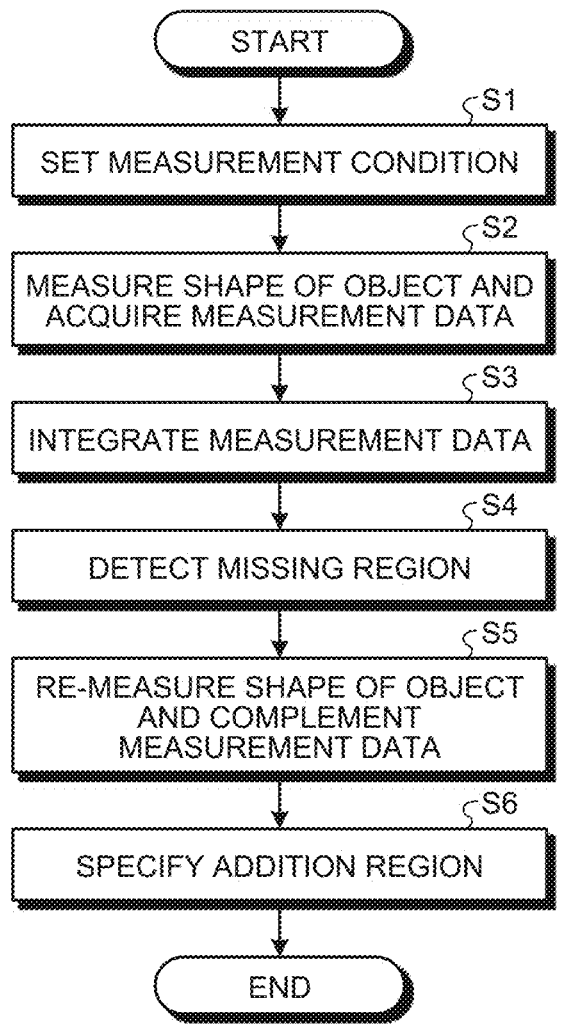
FIG. 3 is a first flowchart illustrating a procedure of processing by the measurement device according to the first embodiment.

Next, processing by the measurement device 10 will be described. FIG. 3 is a first flowchart illustrating a procedure of the processing by the measurement device 10 according to the first embodiment. FIG. 3 illustrates the procedure of the processing in a case where the measurement device 10 specifies the addition region.

In step S1, the measurement condition setting unit 11 of the measurement device 10 sets the measurement conditions. In accordance with a state of the object, the measurement condition setting unit 11 sets the measurement conditions such as the placeable range, the measurement distance, the observation angle, and the exposure time.

The sensor 12 of the measurement device 10 acquires the image information by imaging the object. In step S2, the measurement unit 13 of the measurement device measures the shape of the object on the basis of the image information, thereby acquiring the measurement data. In step S3, the measurement data integrating unit 14 of the measurement device 10 integrates the measurement data. The measurement data integrating unit 14 integrates the measurement data imaged a plurality of times.

In step S4, the missing region detecting unit 15 of the measurement device 10 detects the missing region on the basis of the measurement data integrated in step S3. In step S5, the measurement data complementing unit 16 of the measurement device 10 re-measures the shape of the object and complements the measurement data. In step S6, the machining region specifying unit 17 of the measurement device 10 specifies the addition region on the basis of the measurement data complemented in step S5. After the above steps, the measurement device 10 ends the processing according to the procedure illustrated in FIG. 3.

Figure 4:
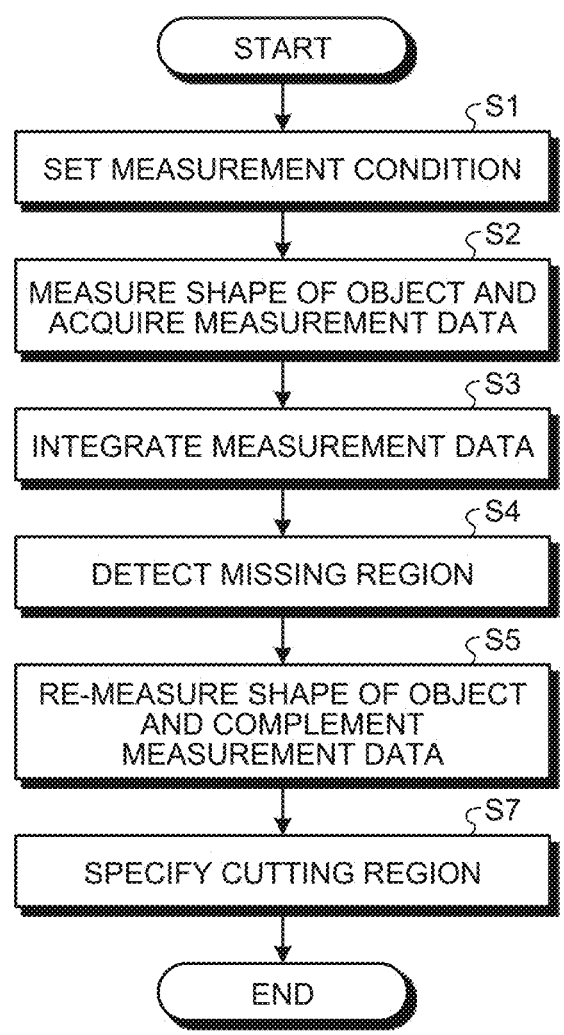
FIG. 4 is a second flowchart illustrating a procedure of processing by the measurement device according to the first embodiment.

FIG. 4 is a second flowchart illustrating a procedure of the processing by the measurement device 10 according to the first embodiment. FIG. 4 illustrates the procedure of the processing in a case where the measurement device 10 specifies the cutting region. The procedure of steps S1 to S5 illustrated in FIG. 4 is similar to the procedure of steps S1 to S5 illustrated in FIG. 3. After completing step S5 illustrated in FIG. 4, the measurement device 10 proceeds to step S7 of the procedure.

In step S7, the machining region specifying unit 17 of the measurement device 10 specifies the cutting region on the basis of the measurement data complemented in step S5. After the above steps, the measurement device 10 ends the processing according to the procedure illustrated in FIG. 4.

According to the first embodiment, the measurement device 10 detects the missing region of the object, the missing region being the region where the measurement data is missing. The measurement device 10 acquires the re-measurement data about the missing region by re-measuring the shape of the object on the basis of the image information which the sensor 12 has acquired by re-imaging, and complements the measurement data with the re-measurement data. By complementing the measurement data, the measurement device 10 can accurately specify the machining region for objects having various shapes or sizes.

The measurement device 10 thus has an effect of accurately specifying the machining region for addition or cutting in adding materials to the object or cutting the object. The measurement device 10 is suitable for machining an intricate component and can be used in machining, for example, a vehicle component, an aircraft component such as a turbine, or a space component. The measurement device 10 can improve the efficiency of setup work for specifying the addition region or the cutting region. The measurement device 10 can shorten the period required for the setup work and can also reduce the cost required for the setup work.

Second Embodiment

Figure 5:
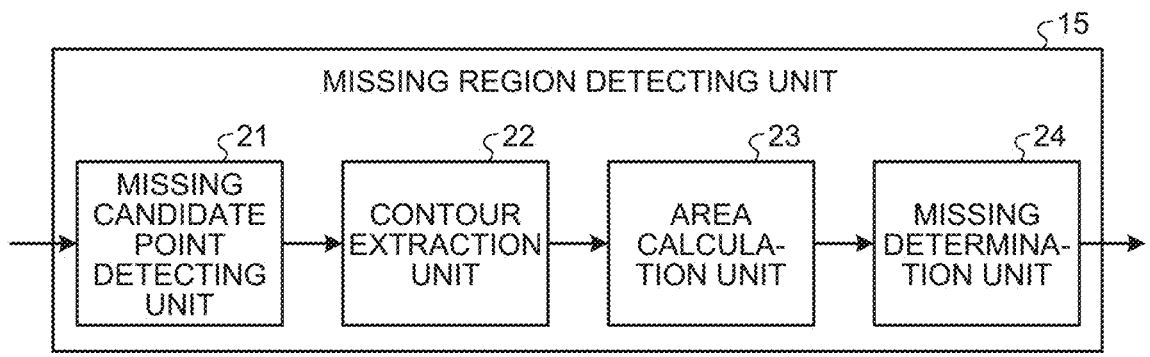
FIG. 5 is a diagram illustrating an example of a configuration of a missing region detecting unit of a measurement device according to a second embodiment.

A second embodiment will describe an example of a configuration of the missing region detecting unit 15 and an example of a configuration of the measurement data complementing unit 16. FIG. 5 is a diagram illustrating the example of the configuration of the missing region detecting unit 15 of the measurement device 10 according to the second embodiment. The missing region detecting unit 15 includes a missing candidate point detecting unit 21, a contour extraction unit 22, an area calculation unit 23, and a missing determination unit 24.

The missing candidate point detecting unit 21 detects a missing candidate point from the measurement data acquired by the measurement unit 13. The missing candidate point is a candidate for a point included in the contour of the missing region. The missing candidate point detecting unit 21 detects the missing candidate point from the three-dimensional point cloud data that is the measurement data. The missing candidate point detecting unit 21 determines a point of interest from the three-dimensional point cloud data. The missing candidate point detecting unit 21 calculates an angle formed between a vector from the point of interest toward a first neighboring point and a vector from the point of interest toward a second neighboring point. The first and second neighboring points are among neighboring points that are points around the point of interest in the point cloud. When the vector from the point of interest toward the first neighboring point is expressed as ($a_1$, $a_2$, $a_3$) and the vector from the point of interest toward the second neighboring point is expressed as ($b_1$, $b_2$, $b_3$), the missing candidate point detecting unit 21 calculates an angle θ expressed by the following formula (1).

Formula 1

$$\cos\theta = \frac{a_1 b_1 + a_2 b_2 + a_3 b_3}{\sqrt{a_1^2 + a_2^2 + a_3^2} \sqrt{b_1^2 + b_2^2 + b_3^2}} \quad (1)$$

The missing candidate point detecting unit 21 generates a histogram of the angle θ calculated. In a case where the histogram indicates a distribution around an angle larger than a certain reference angle, the missing candidate point detecting unit 21 determines that the point of interest for that distribution is the missing candidate point. In a case where the histogram indicates a distribution around an angle smaller than the reference angle, the missing candidate point detecting unit 21 determines that the point of interest for that distribution is not the missing candidate point. As a result of determining whether individual one of all points in the three-dimensional point cloud data is the missing candidate point, the missing candidate point detecting unit 21 detects the missing candidate points from the three-dimensional point cloud data. Note that the missing candidate point detecting unit 21 can change the reference angle, depending on the shape of the object. Also, the method of detecting the missing candidate point is not limited to the method described in the second embodiment, and may be any method.

The contour extraction unit 22 extracts a contour including the missing candidate point from data on the missing candidate point. For example, the contour extraction unit 22 extracts the contour by projecting the missing candidate point onto a certain plane and performing edge extraction using the Canny method or the like. The contour extraction unit 22 can extract the contour by extending the Canny method to three dimensions and performing edge extraction from 3D data. Note that the method of extracting the contour including the missing candidate point is not limited to the method described in the second embodiment, and can be any method.

The area calculation unit 23 calculates an area of a region surrounded by the contour extracted by the contour extraction unit 22. For example, the area calculation unit 23 calculates the area by projecting the contour onto a certain plane and performing labeling processing on the region surrounded by the contour. Note that the method of calculating the area of the region surrounded by the contour is not limited to the method described in the second embodiment, and can be any method.

On the basis of the area calculated by the area calculation unit 23, the missing determination unit 24 determines whether the region surrounded by the contour extracted by the contour extraction unit 22 is the missing region. By comparing the calculated area with a preset threshold, the missing determination unit 24 determines whether the region is the missing region. In a case where the calculated area is larger than or equal to the threshold, the missing determination unit 24 determines that the region surrounded by the contour is the missing region, and outputs the contour-surrounded region as the missing region. In a case where the calculated area is smaller than the threshold, the missing determination unit 24 determines that the region surrounded by the contour is not the missing region. Note that the missing determination unit 24 can change the threshold of the area, depending on the shape of the object. Also, the method of determining whether or not the region is the missing region is not limited to the method described in the second embodiment, and may be any method.

Figure 6:
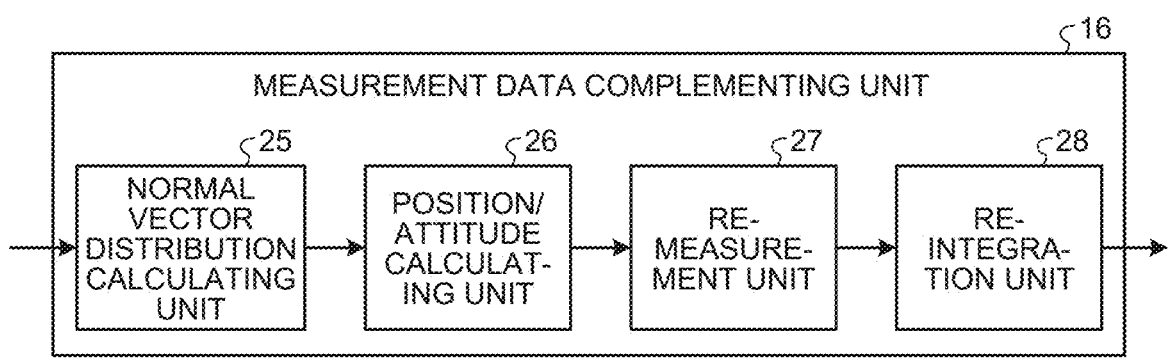
FIG. 6 is a diagram illustrating an example of a configuration of a measurement data complementing unit of the measurement device according to the second embodiment.

FIG. 6 is a diagram illustrating the example of the configuration of the measurement data complementing unit 16 of the measurement device 10 according to the second embodiment. The measurement data complementing unit 16 includes a normal vector distribution calculating unit 25, a position/posture calculating unit 26, a re-measurement unit 27, and a re-integration unit 28.

The normal vector distribution calculating unit 25 calculates a normal distribution that is a distribution of directions of normals in the missing region detected by the missing region detecting unit 15. For example, the normal distribution calculating unit 25 determines a center point in the missing region and obtains a triangular plane by connecting the center point and two points of a plurality of points on the contour. The normal distribution calculating unit 25 estimates a plane that is the triangular plane. For example, in a case where the missing region is represented by a quadrangle, four triangular planes are obtained. The plane is expressed by the following formula (2).

Formula 2

$$ax + by + cz + d = 0 \quad (2)$$

According to formula (2), a normal vector of the triangular plane is expressed as (a, b, c). The normal distribution calculating unit 25 can obtain (a, b, c) as a parameter representing the normal for the plurality of triangular planes, and calculate the normal distribution on the basis of the parameters obtained. Note that the method of calculating the normal distribution is not limited to the method described in the second embodiment, and may be any method.

On the basis of the normal distribution, the position/posture calculating unit 26 calculates the position or posture of the object or the position or posture of the sensor 12 such that the sensor 12 faces the object. For example, the position/posture calculating unit 26 obtains, from among the normal vectors in the missing region, the normal with a frequency higher than or equal to a preset threshold. The position/posture calculating unit 26 calculates the position or posture of the object or the position or posture of the sensor 12 such that the direction of an optical axis of the sensor 12 is close to the direction of the normal obtained. Note that the method of calculating the position or posture of the object or the position or posture of the sensor 12 such that the sensor 12 faces the object is not limited to the method described in the second embodiment, and may be any method. The phrase "the sensor 12 faces the object" does not necessarily mean that the object and the sensor 12 face each other directly in front of each other. The missing region detected by the missing region detecting unit 15 need only be included in a region whose image can be acquired by the sensor 12, and the object and the sensor 12 do not need to face each other directly in front of each other. The phrase "the sensor 12 faces the object" includes an example where the object and the sensor 12 do not face each other directly in front of each other.

The re-measurement unit 27 re-measures the shape of the object on the basis of the image information which the sensor 12 has acquired by re-imaging after the position or posture of the object or the position or posture of the sensor 12 is corrected. The re-measurement unit 27 performs re-measurement by correcting at least one of the position of the object, the posture of the object, the position of the sensor 12, and the posture of the sensor 12 on the basis of the calculated result by the position/posture calculating unit 26. The re-measurement unit 27 acquires re-measurement data on the missing region by re-measuring the shape of the object.

The re-integration unit 28 integrates the re-measurement data acquired by the re-measurement unit 27, into the measurement data acquired by the measurement unit 13. In a case where the re-measurement data includes unnecessary data such as data about a background of the object, the re-integration unit 28 can delete the unnecessary background data, using the background subtraction method. Accordingly, the re-integration unit 28 can integrate only the re-measurement data on the object into the measurement data.

When integrating the re-measurement data into the measurement data, the re-integration unit 28 calculates a complementation ratio indicating a ratio by which the measurement data in the missing region is complemented. In a case where the calculated complementation ratio exceeds a preset threshold, the measurement data complementing unit 16 of the measurement device 10 completes the complementation of the measurement data. In a case where the calculated complementation ratio does not exceed the threshold, the detection of the missing region and the complementation of the measurement data are repeated by the missing region detecting unit 15 and the measurement data complementing unit 16, respectively.

Figure 7:
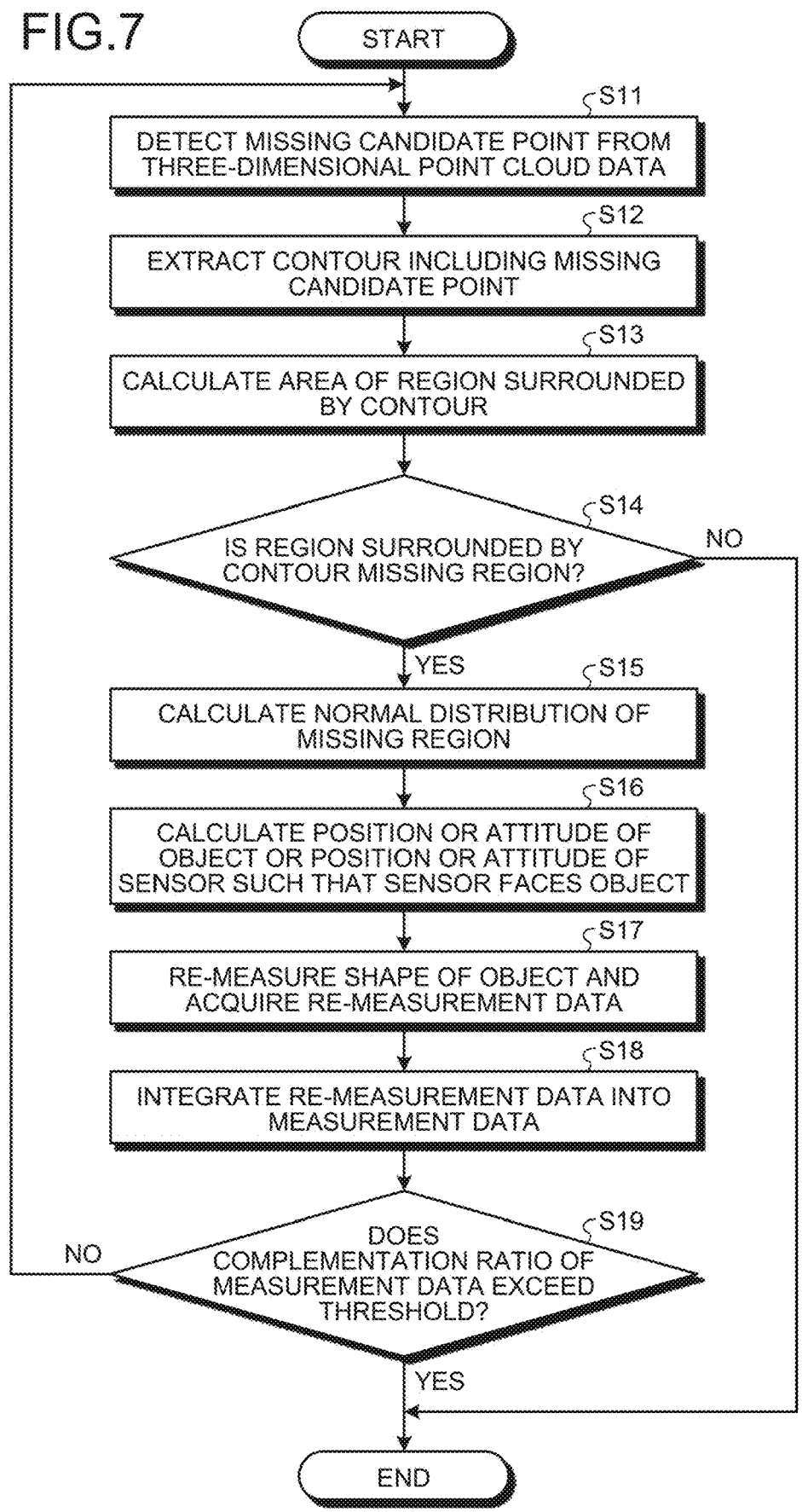
FIG. 7 is a flowchart illustrating a procedure of processing by the missing region detecting unit and the measurement data complementing unit of the measurement device according to the second embodiment.

Next, processing by the missing region detecting unit 15 and the measurement data complementing unit 16 will be described. FIG. 7 is a flowchart illustrating a procedure of the processing by the missing region detecting unit 15 and the measurement data complementing unit 16 of the measurement device 10 according to the second embodiment.

In step S11, the missing candidate point detecting unit 21 of the missing region detecting unit 15 detects the missing candidate point from the three-dimensional point cloud data that is the measurement data. In step S12, the contour extraction unit 22 of the missing region detecting unit 15 extracts the contour including the missing candidate point detected in step S11. In step S13, the area calculation unit 23 of the missing region detecting unit 15 calculates the area of the region surrounded by the contour extracted in step S12.

In step S14, the missing determination unit 24 of the missing region detecting unit 15 determines whether the region surrounded by the contour is the missing region. By comparing the calculated area with the preset threshold, the missing determination unit 24 determines whether the region is the missing region. In a case where the missing determination unit 24 determines that the region surrounded by the contour is not the missing region (No in step S14), the missing region detecting unit 15 and the measurement data complementing unit 16 end the processing according to the procedure illustrated in FIG. 7. In a case where the missing determination unit 24 determines that the region surrounded by the contour is the missing region (Yes in step S14), the missing region detecting unit 15 and the measurement data complementing unit 16 proceed to step S15 of the procedure.

In step S15, the normal distribution calculating unit 25 of the measurement data complementing unit 16 calculates the normal distribution of the missing region. In step S16, the position/posture calculating unit 26 of the measurement data complementing unit 16 calculates the position or posture of the object or the position or posture of the sensor 12 such that the sensor 12 faces the object.

In step S17, the re-measurement unit 27 of the measurement data complementing unit 16 corrects the position or posture of the object or the position or posture of the sensor 12, re-measures the shape of the object, and acquires the re-measurement data. In step S18, the re-integration unit 28 of the measurement data complementing unit 16 integrates the re-measurement data acquired in step S17 into the measurement data.

In step S19, the re-integration unit 28 determines whether the complementation ratio of the measurement data exceeds the threshold. In a case where the complementation ratio of the measurement data does not exceed the threshold (No in step S19), the missing region detecting unit 15 and the measurement data complementing unit 16 return to step S11 of the procedure and repeat the detection of the missing region and the complementation of the measurement data. On the other hand, in a case where the complementation ratio of the measurement data exceeds the threshold (Yes in step S19), the missing region detecting unit 15 and the measurement data complementing unit 16 end the processing according to the procedure illustrated in FIG. 7.

According to the second embodiment, the missing region detecting unit 15 detects the missing candidate point and extracts the contour including the missing candidate point. The missing region detecting unit 15 can detect the missing region by determining whether the region surrounded by the contour is the missing region on the basis of the area of the region surrounded by the contour. Moreover, the measurement data complementing unit 16 calculates the normal distribution of the missing region and calculates the position or posture of the object or the position or posture of the sensor 12 such that the sensor 12 faces the object. The measurement data complementing unit 16 acquires the re-measurement data by re-measuring the object after the position or posture of the object or the position or posture of the sensor 12 is corrected, and integrates the re-measurement data into the measurement data. The measurement device 10 can thus complement the measurement data on the missing region. The measurement device 10 thus has the effect of accurately specifying the machining region for addition or cutting in adding materials to the object or cutting the object.

Third Embodiment

Figure 8:
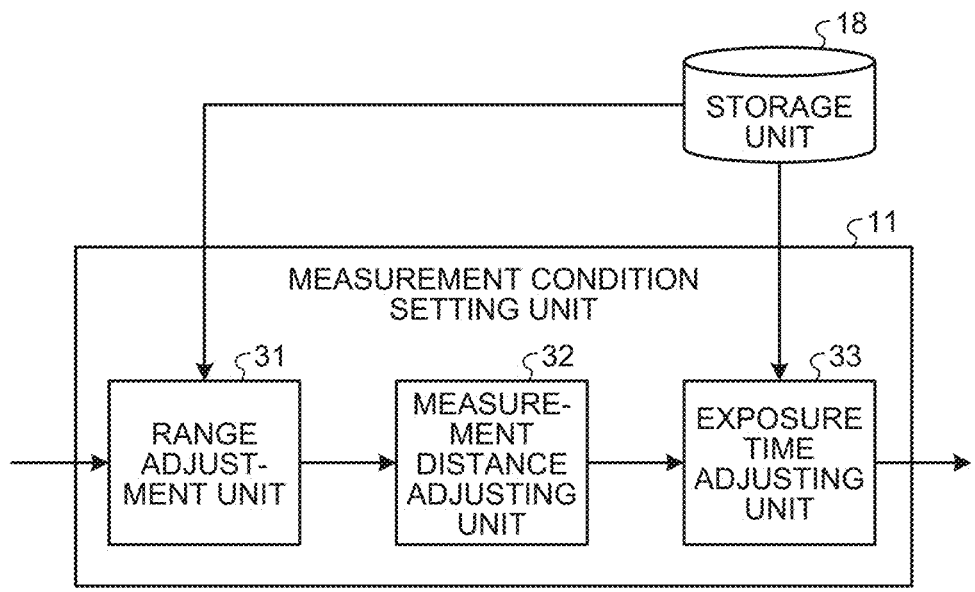
FIG. 8 is a diagram illustrating an example of a configuration of a measurement condition setting unit of a measurement device according to a third embodiment.

A third embodiment will describe an example of a configuration of the measurement condition setting unit 11. FIG. 8 is a diagram illustrating the example of the configuration of the measurement condition setting unit 11 of the measurement device 10 according to the third embodiment. The measurement condition setting unit 11 includes a range adjustment unit 31, a measurement distance adjusting unit 32, and an exposure time adjusting unit 33.

The range adjustment unit 31 adjusts the placeable range that is the range in which the object and the sensor 12 can be placed when the image information is acquired. The measurement distance adjusting unit 32 adjusts the measurement distance of the sensor 12. The measurement distance is the distance from the sensor 12 to the object. The exposure time adjusting unit 33 adjusts the exposure time of the sensor 12 when the image information is acquired. The storage unit 18 stores the first reference model representing the shape of the object and a lookup table as will be described later. The range adjustment unit 31 adjusts the placeable range, using the first reference model read from the storage unit 18. The exposure time adjusting unit 33 adjusts the exposure time, using the lookup table read from the storage unit 18. Details of a configuration of each of the range adjustment unit 31, the measurement distance adjusting unit 32, and the exposure time adjusting unit 33 will be described later.

Figure 9:
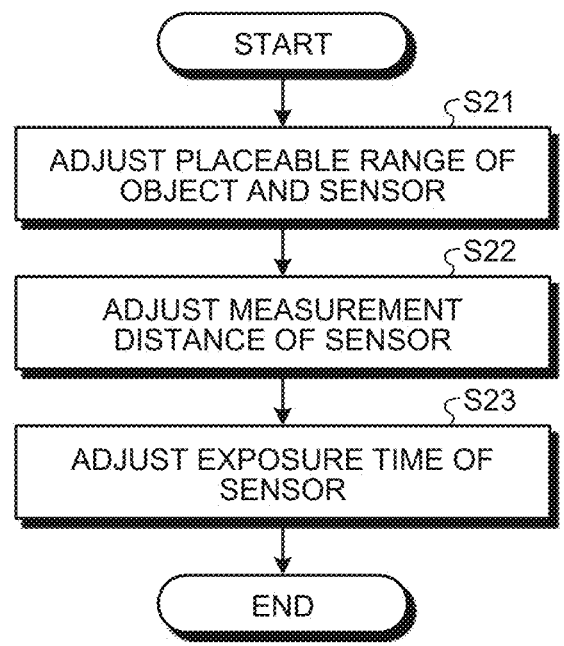
FIG. 9 is a flowchart illustrating a procedure of processing by the measurement condition setting unit of the measurement device according to the third embodiment.

Next, processing by the measurement condition setting unit 11 will be described. FIG. 9 is a flowchart illustrating a procedure of the processing by the measurement condition setting unit 11 of the measurement device 10 according to the third embodiment.

In step S21, the range adjustment unit 31 of the measurement condition setting unit 11 adjusts the placeable range of the object and the sensor 12. In step S22, the measurement distance adjusting unit 32 of the measurement condition setting unit 11 adjusts the measurement distance of the sensor 12. In step S23, the exposure time adjusting unit 33 of the measurement condition setting unit 11 adjusts the exposure time of the sensor 12. After the above steps, the measurement condition setting unit 11 ends the processing according to the procedure illustrated in FIG. 9. Details of the processing by each of the range adjustment unit 31, the measurement distance adjusting unit 32, and the exposure time adjusting unit 33 will be described later.

Figure 10:
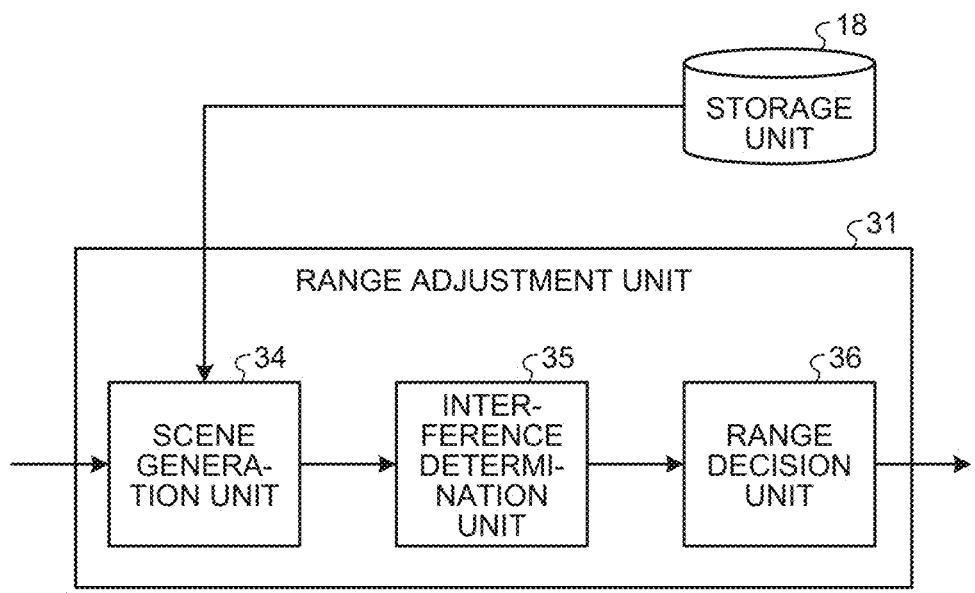
FIG. 10 is a diagram illustrating an example of a configuration of a range adjustment unit of the measurement condition setting unit in the third embodiment.

FIG. 10 is a diagram illustrating an example of the configuration of the range adjustment unit 31 of the measurement condition setting unit 11 in the third embodiment. The range adjustment unit 31 includes a scene generation unit 34, an interference determination unit 35, and a range decision unit 36.

The scene generation unit 34 places the object, the sensor 12, and a structure around the object or the sensor 12 in a virtual space, thereby generating a simulated scene at the time of imaging of the object. The scene generation unit 34 acquires the first reference model from the storage unit 18. The scene generation unit 34 places the object represented by the first reference model, the sensor 12, and the structure in the virtual space. For example, in a case where the object is rotated by the rotary stage, the rotary stage and a drive unit of the rotary stage can be included as the structure around the object. A condition for generating the simulated scene is manually set by a user of the measurement device 10. The scene generation unit 34 may automatically set the condition on the basis of a default value or a preset value prepared in advance.

The interference determination unit 35 determines the presence or absence of interference between the object or the sensor 12 and the structure when at least one of the position of the object, the posture of the object, the position of the sensor 12, and the posture of the sensor 12 is changed in the scene.

A direction in which to change the position of the object and a direction in which to change the position of the sensor 12 can be set to any direction among the X axis direction, the Y axis direction, and the Z axis direction. An axis of rotation for changing the posture of the object and an axis of rotation for changing the posture of the sensor 12 can be set to any axis of rotation among the A axis, the B axis, and a C axis. The A axis, the B axis, and the C axis are three axes of rotation perpendicular to one another. The direction in which to change the position of the object, the direction in which to change the position of the sensor 12, the axis of rotation for changing the posture of the object, and the axis of rotation for changing the posture of the sensor 12 are manually set by a user of the measurement device 10. The interference determination unit 35 may automatically set, on the basis of a default value or a preset value prepared in advance, the direction in which to change the position of the object, the direction in which to change the position of the sensor 12, the axis of rotation for changing the posture of the object, and the axis of rotation for changing the posture of the sensor 12.

The range decision unit 36 decides the placeable range of the object and the sensor 12 on the basis of a determination result provided by the interference determination unit 35. For example, the range decision unit 36 decides, as the placeable range, a range in which the object and the sensor 12 do not interfere with the structure around the object or the sensor 12. As the range decision unit 36 thus decides the placeable range, the measurement condition setting unit 11 sets the placeable range, which is one of the measurement conditions. With the object and the sensor 12 placed in the set placeable range, the sensor 12 images the object, such that the measurement unit 13 measures the object.

The position or posture of the object or the position or posture of the sensor 12 at the start of measurement by the measurement unit 13 is manually decided by a user on the basis of the set placeable range. Alternatively, the position or posture of the object or the position or posture of the sensor 12 at the start of measurement by the measurement unit 13 can be automatically decided by the measurement unit 13 on the basis of the set placeable range.

Figure 11:
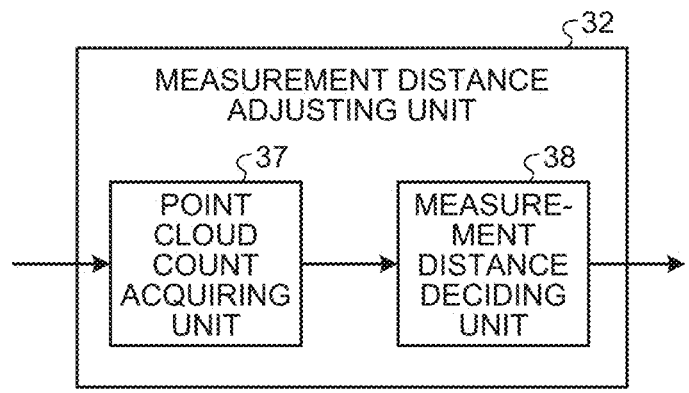
FIG. 11 is a diagram illustrating an example of a configuration of a measurement distance adjusting unit of the measurement condition setting unit in the third embodiment.

FIG. 11 is a diagram illustrating an example of the configuration of the measurement distance adjusting unit 32 of the measurement condition setting unit 11 in the third embodiment. The measurement distance adjusting unit 32 includes a point cloud count acquiring unit 37 and a measurement distance deciding unit 38.

The point cloud count acquiring unit 37 acquires a point cloud count that is the number of points included in the three-dimensional point cloud data acquired by the sensor 12. For example, the point cloud count acquiring unit 37 acquires the point cloud count of the first reference model by simulating imaging of the first reference model in the virtual space. The point cloud count acquiring unit 37 acquires the point cloud count, changing the measurement distance within the placeable range set by the range adjustment unit 31, such that the point cloud count acquiring unit 37 acquires the point cloud count for each measurement distance. The point cloud count acquiring unit 37 can acquire the point cloud count, changing the measurement distance and the observation angle of the sensor 12, such that the point cloud count acquiring unit 37 acquires the point cloud count corresponding to the measurement distance and the observation angle.

The measurement distance deciding unit 38 decides the measurement distance at the time of imaging of the object on the basis of the point cloud count which the point cloud count acquiring unit 37 has acquired for each measurement distance. For example, the measurement distance deciding unit 38 compares with one another the point cloud counts acquired for each measurement distance, and decides that the measurement distance with the highest point cloud count is the measurement distance at the time of imaging. In a case where the point cloud count acquiring unit 37 acquires the point cloud count corresponding to the measurement distance and the observation angle, the measurement distance deciding unit 38 can decide the measurement distance and the observation angle at the time of imaging on the basis of the point cloud count acquired corresponding to the measurement distance and the observation angle.

As the measurement distance deciding unit 38 thus decides the measurement distance, the measurement condition setting unit 11 sets the measurement distance, which is one of the measurement conditions. The sensor 12 images the object at the set measurement distance, thereby allowing the measurement unit 13 to measure the object. Note that the method of setting the measurement distance is not limited to the method described in the third embodiment, and can be any method.

Figure 12:
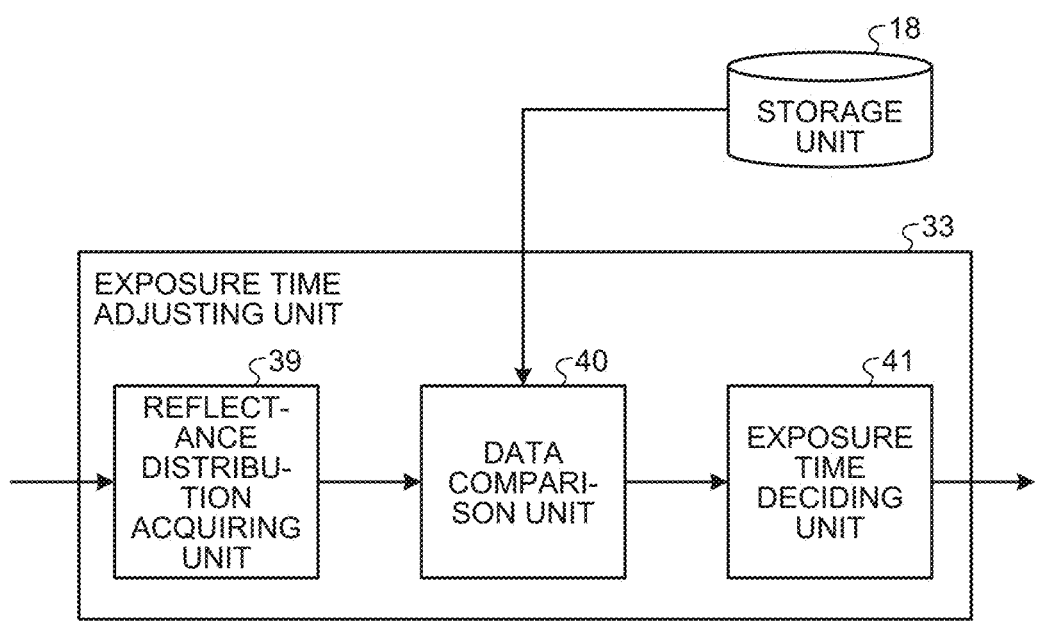
FIG. 12 is a diagram illustrating an example of a configuration of an exposure time adjusting unit of the measurement condition setting unit in the third embodiment.

FIG. 12 is a diagram illustrating an example of the configuration of the exposure time adjusting unit 33 of the measurement condition setting unit 11 in the third embodiment. The exposure time adjusting unit 33 includes a reflectance distribution acquiring unit 39, a data comparison unit 40, and an exposure time deciding unit 41.

The reflectance distribution acquiring unit 39 acquires a reflectance distribution of the object. For example, when the sensor 12 images the object and a reflector having a known reflectance, under the same environment, the reflectance distribution acquiring unit 39 obtains the reflectance distribution of the object on the basis of a measurement result of a brightness value of the reflector. Note that the method of acquiring the reflectance distribution of the object is not limited to the method described in the third embodiment, and can be any method.

The lookup table stored in the storage unit 18 includes a database in which data on reflectance distributions for various bodies is put together. The lookup table includes data on the reflectance distribution for a body with relatively high glossiness and data on the reflectance distribution for a body with relatively low glossiness. For example, the sensor 12 images bodies, and the data on the reflectance distributions for various bodies is acquired in advance on the basis of a result of the imaging of the bodies and stored in the lookup table.

The data comparison unit 40 compares the reflectance distribution of the object with the data on the reflectance distribution stored in advance in the lookup table. By the comparison, the data comparison unit 40 obtains a degree of similarity between the data on the reflectance distribution stored in the lookup table and the reflectance distribution of the object.

The data comparison unit 40 for example uses the following formula (3) to obtain the degree of similarity between the reflectance distribution of the object and the reflectance distribution stored in advance in the lookup table. In the formula, "g(M)" represents the data on the reflectance distribution of the object. Also, "g(P)" represents the data on the reflectance distribution stored in advance in the lookup table for a certain body. The smaller the value expressed by formula (3), the higher the degree of similarity of the reflectance distribution of the object to the reflectance distribution of the body corresponding to "g(P)".

Formula 3

$$\operatorname{argmin}_P(g(M) - g(P)) \quad (3)$$

In the lookup table, the data on the reflectance distribution for each body is associated with a value of a parameter related to measurement using the sensor 12. The parameter related to measurement is, for example, the exposure time, a gain, or the like. The data on the reflectance distribution for each body is associated with a value of a parameter suitable for the sensor 12 to measure the body. For example, the sensor 12 images the body, and the value of the parameter suitable for the measurement is decided in advance on the basis of a result of the imaging of the body.

The exposure time deciding unit 41 decides the exposure time of the sensor 12 on the basis of a comparison result by the data comparison unit 40. The exposure time deciding unit 41 selects, from among the data on the reflectance distributions stored in the lookup table, the data on the reflectance distribution having the highest degree of similarity to the reflectance distribution of the object. The exposure time deciding unit 41 decides that the exposure time associated with the selected data on the reflectance distribution is the exposure time at the time of imaging. Note that, among the parameters related to measurement, a value of the parameter other than the exposure time can be decided in the same manner as the exposure time. The exposure time deciding unit 41 can decide the gain associated with the selected data on the reflectance distribution, as the gain at the time of imaging.

As the exposure time deciding unit 41 thus decides the exposure time, the measurement condition setting unit 11 sets the exposure time, which is one of the measurement conditions. The sensor 12 images the object with the set exposure time, and the measurement unit 13 measures the object. Note that the method of setting the exposure time is not limited to the method described in the third embodiment, and can be any method.

Figure 13:
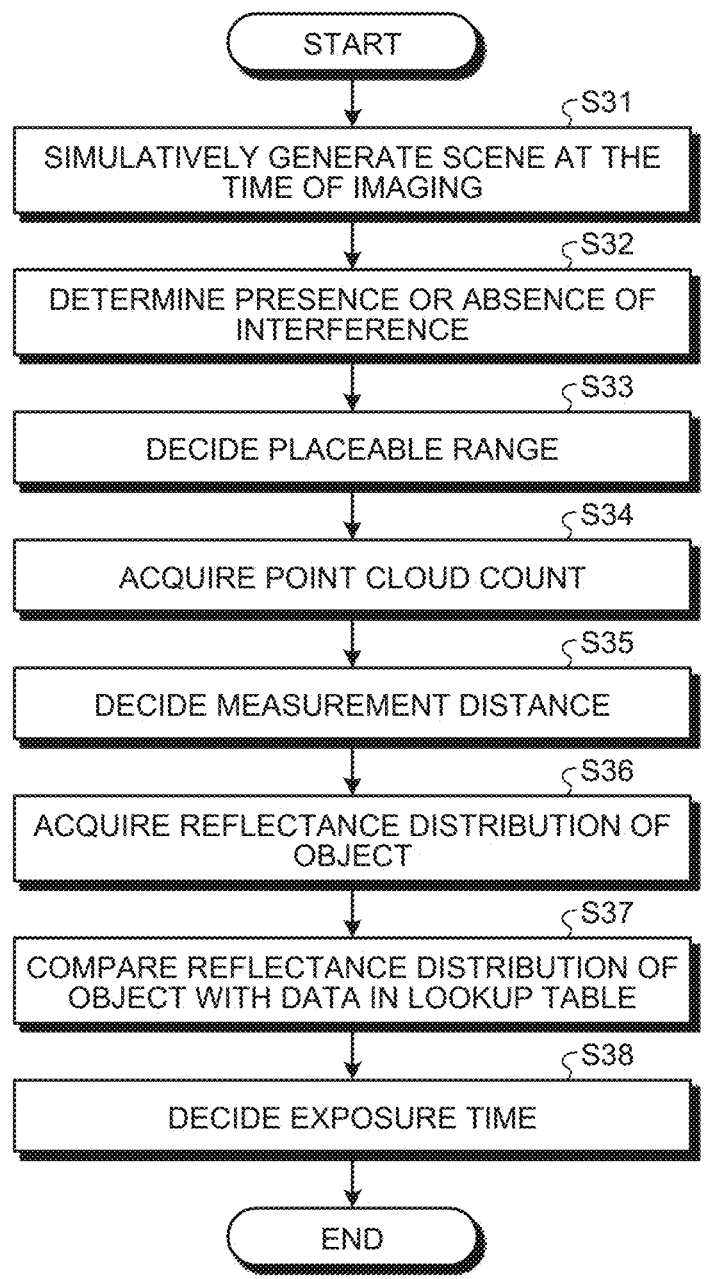
FIG. 13 is a flowchart illustrating a procedure of processing by the range adjustment unit, the measurement distance adjusting unit, and the exposure time adjusting unit of the measurement device according to the third embodiment.

Next, processing by the range adjustment unit 31, the measurement distance adjusting unit 32, and the exposure time adjusting unit 33 will be described. FIG. 13 is a flowchart illustrating a procedure of the processing by the range adjustment unit 31, the measurement distance adjusting unit 32, and the exposure time adjusting unit 33 of the measurement device 10 according to the third embodiment.

In step S31, the scene generation unit 34 of the range adjustment unit 31 generates the simulated scene at the time of imaging of the object. In step S32, the interference determination unit 35 of the range adjustment unit 31 determines the presence or absence of interference between the object or the sensor 12 and the structure in the scene generated in step S31. In step S33, the range decision unit 36 of the range adjustment unit 31 decides the placeable range of the object and the sensor 12 on the basis of the determination result in step S32.

In step S34, the point cloud count acquiring unit 37 of the measurement distance adjusting unit 32 acquires the point cloud count. In step S35, the measurement distance deciding unit 38 of the measurement distance adjusting unit 32 decides the measurement distance at the time of imaging of the object on the basis of the point cloud count acquired in step S34.

In step S36, the reflectance distribution acquiring unit 39 of the exposure time adjusting unit 33 acquires the reflectance distribution of the object. In step S37, the data comparison unit 40 of the exposure time adjusting unit 33 compares the reflectance distribution of the object acquired in step S36 with the data in the lookup table. In step S38, the exposure time deciding unit 41 of the exposure time adjusting unit 33 decides the exposure time at the time of imaging of the object on the basis of the comparison result in step S37. After the above steps, the range adjustment unit 31, the measurement distance adjusting unit 32, and the exposure time adjusting unit 33 end the processing according to the procedure illustrated in FIG. 13.

According to the third embodiment, the measurement condition setting unit 11 sets the placeable range, the measurement distance, and the exposure time when the image information is acquired. The measurement device 10 can set the measurement conditions suitable for the measurement unit 13 to measure the object. The measurement device 10 thus has the effect of accurately specifying the machining region for addition or cutting in adding materials to the object or cutting the object.

Fourth Embodiment

Figure 14:
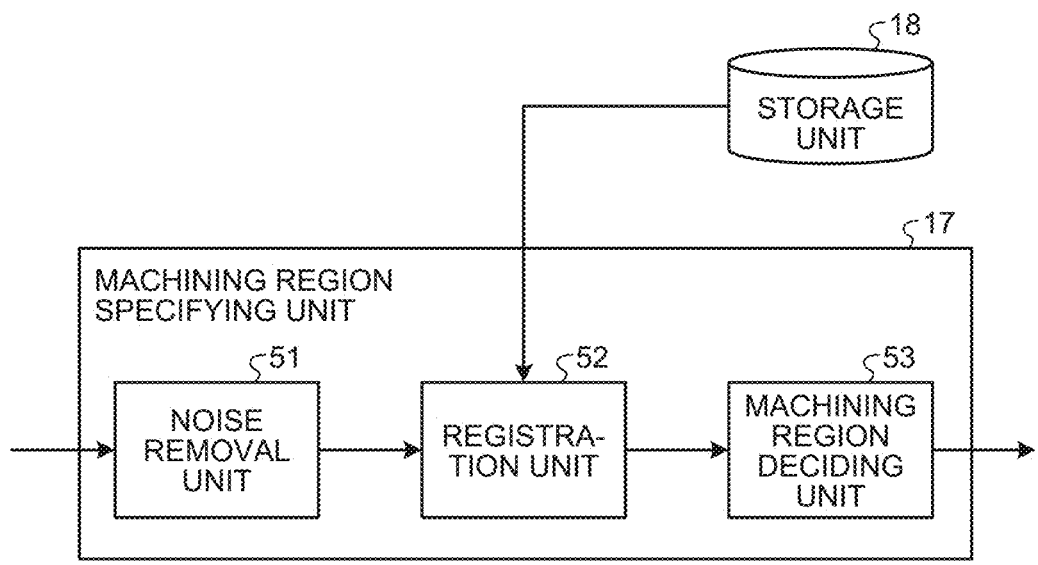
FIG. 14 is a diagram illustrating an example of a configuration of a machining region specifying unit of a measurement device according to a fourth embodiment.

A fourth embodiment will describe an example of a configuration of the machining region specifying unit 17. FIG. 14 is a diagram illustrating the example of the configuration of the machining region specifying unit 17 of the measurement device 10 according to the fourth embodiment. The machining region specifying unit 17 includes a noise removal unit 51, a registration unit 52, and a machining region deciding unit 53.

The noise removal unit 51 removes noise in the measurement data complemented by the measurement data complementing unit 16. For example, the noise removal unit 51 sets a threshold for each coordinate of the three-dimensional point cloud data, i.e., the measurement data, and removes data deviating from a range defined by the threshold as the noise removal unit 51 regards such data as noise.

In a case where the object has a simple shape such as a rectangular parallelepiped, the noise removal unit 51 can estimate a primitive shape that is a combination of planes and remove data deviating from the estimated primitive shape as the noise removal unit 51 regards such data as noise. The noise removal unit 51 can use a random sample consensus (RANSAC) method to remove the data deviating from the primitive shape in the measurement data. The noise removal unit 51 can perform statistical processing on the three-dimensional point cloud data and remove noise on the basis of a statistical value. Note that the method of removing noise is not limited to the method described in the fourth embodiment, and can be any method.

The registration unit 52 performs registration between the second reference model and the measurement data having the noise removed by the noise removal unit 51. The second reference model is the model of the finished product obtained by addition or cutting. The registration unit 52 performs registration by iterative closest point (ICP) or registration on a feature point basis.

Other than performing registration by ICP or the like that aligns the measurement data with the entire second reference model, the registration unit 52 can designate a part of the second reference model and perform registration based on the designated part. For example, in a case where the object has a complex shape or a special shape, in a case where the object is a manufactured product larger than the finished product, or the like, the registration unit 52 can perform registration based on a special portion of the object such as a portion to be cut out. A result of registration by the registration unit 52 can be manually fine-tuned by a user. Note that the method of registration is not limited to the method described in the fourth embodiment, and can be any method.

The machining region deciding unit 53 decides the machining region, which is the addition region or the cutting region, on the basis of the measurement data and the second reference model aligned by the registration unit 52. The machining region deciding unit 53 decides the machining region by calculating a difference between the measurement data and the second reference model.

When deciding the addition region, the machining region deciding unit 53 decides that a difference obtained by subtracting the three-dimensional point cloud data from the second reference model is the addition region, as the addition region is a region that exists in the second reference model but not in the three-dimensional point cloud data. For example, the machining region deciding unit 53 calculates a difference between vertices in the second reference model and the three-dimensional point cloud data, and outputs a result of the calculation of the difference at the vertices, the thus output data being defined as data indicating the addition region decided. The machining region deciding unit 53 can output two types of data: the result of the calculation of the difference at the vertices; and a mesh, the thus output data being defined as the data indicating the addition region decided. In a case where the second reference model has few vertices and it is difficult to represent the addition region by the result of the calculation of the difference at the vertices, the machining region deciding unit 53 can convert the second reference model into three-dimensional point cloud data and then calculate a difference between the three-dimensional point cloud data as the second reference model and the three-dimensional point cloud data as the measurement data. As the machining region deciding unit 53 thus decides the addition region, the machining region specifying unit 17 specifies the addition region. Note that the method of deciding the addition region is not limited to the method described in the fourth embodiment, and can be any method.

When deciding the cutting region, the machining region deciding unit 53 decides that a difference obtained by subtracting the second reference model from the three-dimensional point cloud data is the cutting region as the cutting region is a region that exists in the three-dimensional point cloud data but not in the second reference model. For example, the machining region deciding unit 53 calculates a difference between the three-dimensional point cloud data and vertices in the second reference model, and outputs a result of the calculation of the difference at the vertices, the thus output data being defined as data indicating the cutting region decided. The machining region deciding unit 53 may output two types of data: the result of the calculation of the difference at the vertices; and a mesh, the thus output data being defined as the data indicating the cutting region decided. In a case where the second reference model has few vertices and it is difficult to represent the cutting region by the result of the calculation of the difference at the vertices, the machining region deciding unit 53 can convert the second reference model into three-dimensional point cloud data and then calculate a difference between the three-dimensional point cloud data as the measurement data and the three-dimensional point cloud data as the second reference model. As the machining region deciding unit 53 thus decides the cutting region, the machining region specifying unit 17 specifies the cutting region. Note that the method of deciding the cutting region is not limited to the method described in the fourth embodiment, and can be any method.

Figure 15:
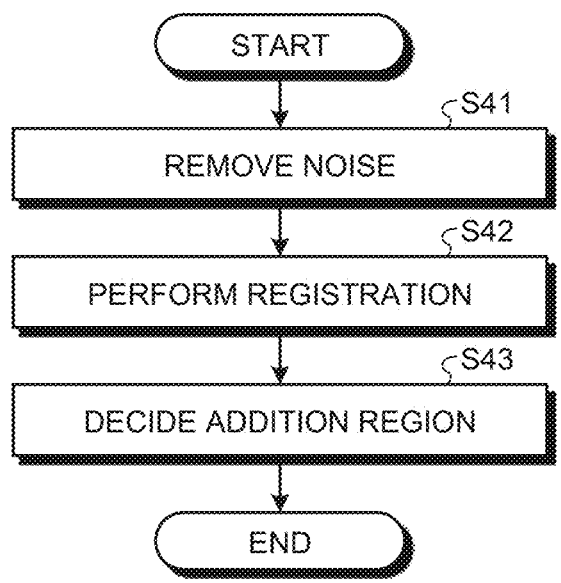
FIG. 15 is a first flowchart illustrating a procedure of processing by the machining region specifying unit of the measurement device according to the fourth embodiment.

Next, processing by the machining region specifying unit 17 will be described. FIG. 15 is a first flowchart illustrating a procedure of the processing by the machining region specifying unit 17 of the measurement device 10 according to the fourth embodiment. FIG. 15 illustrates the procedure of the processing in a case where the machining region specifying unit 17 specifies the addition region.

In step S41, the noise removal unit 51 of the machining region specifying unit 17 removes noise in the measurement data complemented by the measurement data complementing unit 16. In step S42, the registration unit 52 of the machining region specifying unit 17 performs registration between the second reference model and the measurement data having the noise removed in step S41, the second reference model being the model of the finished product obtained by addition.

In step S43, the machining region deciding unit 53 of the machining region specifying unit 17 decides the addition region on the basis of the measurement data and the second reference model aligned in step S42. After the above steps, the machining region specifying unit 17 ends the processing according to the procedure illustrated in FIG. 15.

Figure 16:
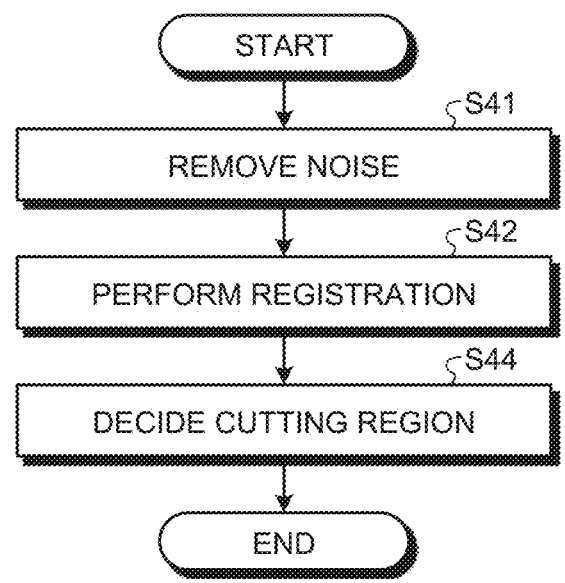
FIG. 16 is a second flowchart illustrating a procedure of processing by the machining region specifying unit of the measurement device according to the fourth embodiment.

FIG. 16 is a second flowchart illustrating a procedure of the processing by the machining region specifying unit 17 of the measurement device 10 according to the fourth embodiment. FIG. 16 illustrates the procedure of the processing in a case where the machining region specifying unit 17 specifies the cutting region.

The procedure of steps S41 and S42 illustrated in FIG. 16 is similar to the procedure of steps S41 and S42 illustrated in FIG. 15. After completing step S42 illustrated in FIG. 16, the machining region specifying unit 17 proceeds to step S44 of the procedure.

In step S44, the machining region deciding unit 53 of the machining region specifying unit 17 decides the cutting region on the basis of the measurement data and the second reference model aligned in step S42. After the above steps, the machining region specifying unit 17 ends the processing according to the procedure illustrated in FIG. 16.

According to the fourth embodiment, the machining region specifying unit 17 performs registration between the measurement data and the second reference model after removing the noise in the measurement data, and decides the machining region. The measurement device 10 can accurately specify the machining region by the machining region specifying unit 17. The measurement device 10 thus has the effect of accurately specifying the machining region for addition or cutting in adding materials to the object or cutting the object.

Fifth Embodiment

Figure 17:
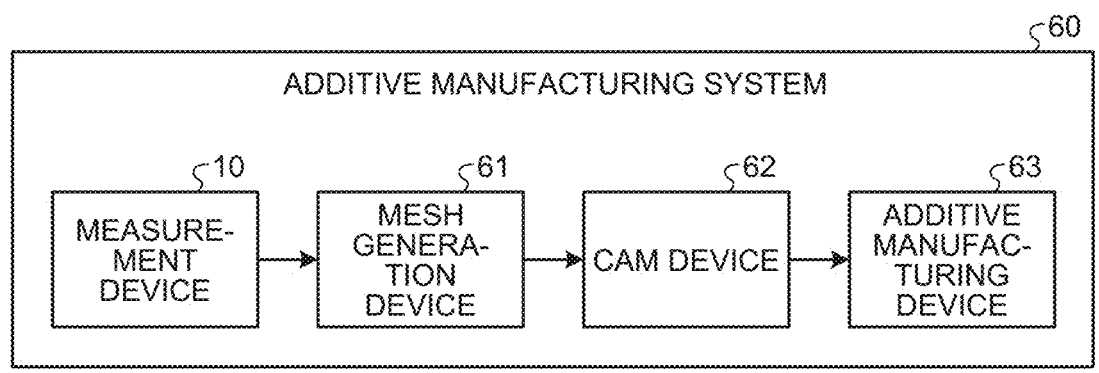
FIG. 17 is a diagram illustrating an example of a configuration of an additive manufacturing system according to a fifth embodiment.

A fifth embodiment will describe the additive manufacturing system including the measurement device 10. FIG. 17 is a diagram illustrating an example of a configuration of an additive manufacturing system 60 according to the fifth embodiment. The additive manufacturing system 60 includes the measurement device 10, a mesh generation device 61, a computer aided manufacturing (CAM) device 62, and an additive manufacturing device 63.

The measurement device 10 measures the shape of the object to thereby specify the addition region for addition. The measurement device 10 of the additive manufacturing system 60 can be any one of the measurement devices 10 according to the first to fourth embodiments. The mesh generation device 61 generates a mesh model. The CAM device 62 generates a machining path for adding a material to the object and generates a machining program. The additive manufacturing device 63 is a machine tool that produces a manufactured product by adding a material to the object.

The mesh generation device 61 is a computer system having a program installed therein for generating the mesh model. The CAM device 62 is a computer system having CAM software installed therein. The CAM software is a program for generating the machining path and generating the machining program. The function of the mesh generation device 61 and the function of the CAM device 62 are implemented by the use of the processing circuitry 80 including the processor 82 and the memory 83, as in the case of the hardware configuration illustrated in FIG. 2.

The mesh generation device 61 generates the mesh model of the addition region specified by the machining region specifying unit 17 illustrated in FIG. 1. For example, the mesh generation device 61 acquires the three-dimensional point cloud data representing the addition region and generates the mesh model from the three-dimensional point cloud data. The mesh generation device 61 can receive the result of specification provided by the machining region specifying unit 17, treating such result as a part of mesh data on the second reference model, i.e., the model of the finished product, and generate the mesh model only for a portion lacking meshes.

The CAM device 62 obtains the machining path on the basis of the mesh model generated by the mesh generation device 61, and converts the machining path into the machining program to thereby generate the machining program. The additive manufacturing device 63 produces the manufactured product in accordance with according to the machining program generated by the CAM device 62.

The additive manufacturing device 63 produces the manufactured product by adding, to the object, a material melted by irradiation with a beam. The beam as a heat source is a laser beam, an electron beam, or the like. An arc may be used as the heat source, instead of the beam. A peripheral device can be attached to the additive manufacturing device 63. The peripheral device is a device for monitoring the manufactured product at the time of production, a device for measuring a temperature or an oxygen concentration in the additive manufacturing device 63, or the like. FIG. 17 illustrates the additive manufacturing system 60 including the single additive manufacturing device 63. The additive manufacturing system 60 illustrated in FIG. 17 produces the manufactured product with the single additive manufacturing device 63. The additive manufacturing system 60 can include a plurality of the additive manufacturing devices 63, and produce the manufactured product with the plurality of the additive manufacturing devices 63.

Figure 18:
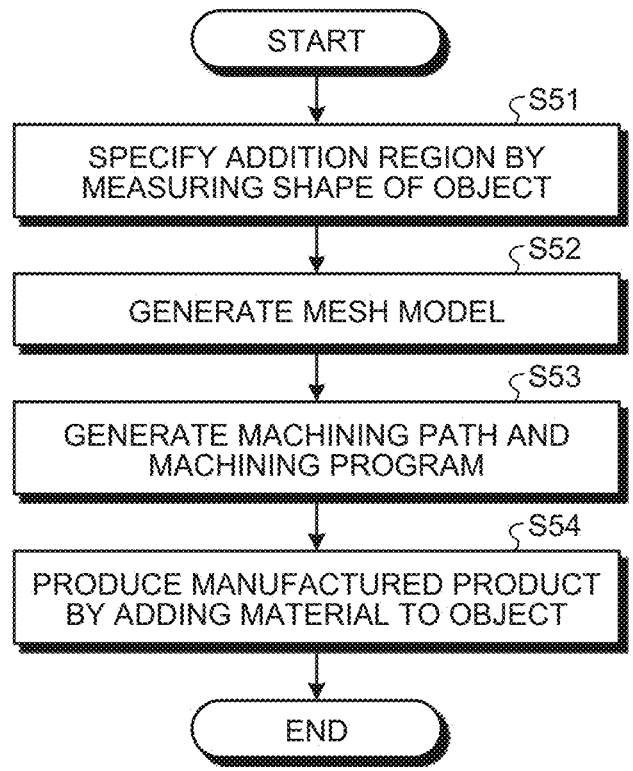
FIG. 18 is a flowchart illustrating an operation procedure of the additive manufacturing system according to the fifth embodiment.

Next, an operation of the additive manufacturing system 60 will be described. FIG. 18 is a flowchart illustrating an operation procedure of the additive manufacturing system 60 according to the fifth embodiment. In step S51, the measurement device 10 of the additive manufacturing system 60 measures the shape of the object to thereby specify the addition region. The measurement device 10 specifies the addition region through a procedure similar to the procedure illustrated in FIG. 3.

In step S52, the mesh generation device 61 of the additive manufacturing system 60 generates the mesh model of the addition region specified in step S51. In step S53, the CAM device 62 of the additive manufacturing system 60 generates the machining path and the machining program on the basis of the mesh model generated in step S52. In step S54, the additive manufacturing device 63 of the additive manufacturing system 60 produces the manufactured product by adding the material to the object. After the above steps, the additive manufacturing system 60 ends the operation according to the procedure illustrated in FIG. 18.

According to the fifth embodiment, the additive manufacturing system 60, which includes the measurement device 10, can accurately specify the addition region. The additive manufacturing system 60 can produce the manufactured product with high accuracy by accurately specifying the addition region. Furthermore, by performing the process throughout from the measurement of the object up to the production of the manufactured product, the additive manufacturing system 60 can improve the efficiency of the setup work up to the production of the manufactured product. The additive manufacturing system 60 can shorten the period required for the setup work and can also reduce the cost required for the setup work. The additive manufacturing system 60 can reduce the period and cost required from the introduction of the additive manufacturing device 63 to the verification of the production of the manufactured product.

Sixth Embodiment

Figure 19:
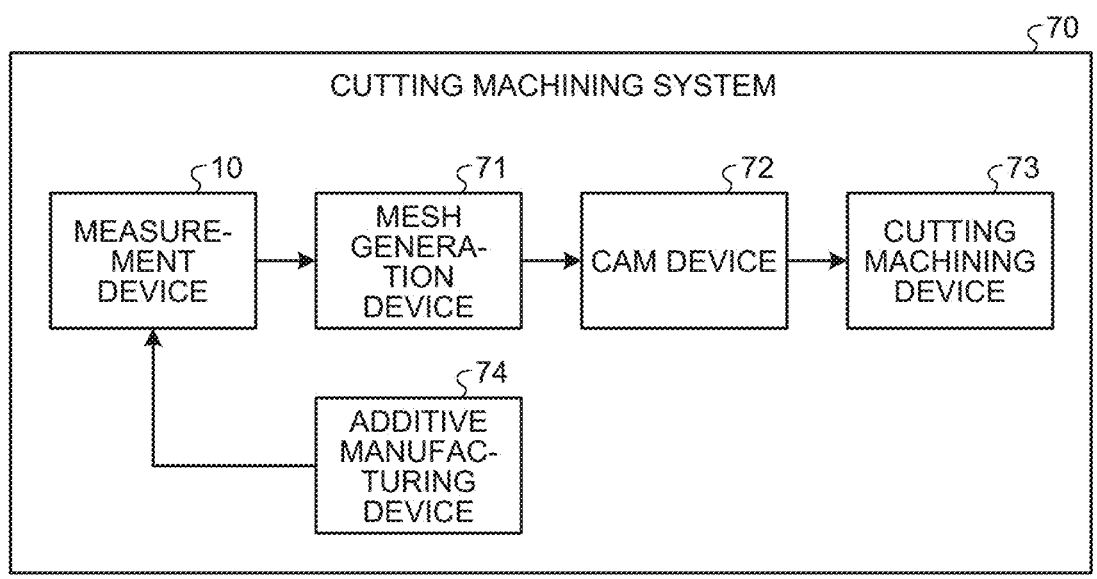
FIG. 19 is a diagram illustrating an example of a configuration of a cutting machining system according to a sixth embodiment.

A sixth embodiment will describe the cutting machining system including the measurement device 10. FIG. 19 is a diagram illustrating an example of a configuration of a cutting machining system 70 according to the sixth embodiment. The cutting machining system 70 includes the measurement device 10, a mesh generation device 71, a CAM device 72, a cutting machining device 73, and an additive manufacturing device 74.

The measurement device 10 measures the shape of the object to thereby specify the cutting region subjected to cutting. The measurement device 10 of the cutting machining system 70 can be any one of the measurement devices 10 according to the first to fourth embodiments. In the sixth embodiment, the object is a manufactured product produced by the additive manufacturing device 74.

The mesh generation device 71 generates a mesh model. The CAM device 72 generates a machining path for cutting the object and generates a machining program. The cutting machining device 73 is a machine tool that produces a machined product by cutting.

The mesh generation device 71 is a computer system having a program installed therein for generating the mesh model. The CAM device 72 is a computer system having CAM software installed therein. The CAM software is a program for generating the machining path and generating the machining program. The function of the mesh generation device 71 and the function of the CAM device 72 are implemented by the use of the processing circuitry 80 including the processor 82 and the memory 83, as in the case of the hardware configuration illustrated in FIG. 2.

The mesh generation device 71 generates the mesh model of the cutting region specified by the machining region specifying unit 17 illustrated in FIG. 1. The mesh generation device 71 can generate the mesh model from the measurement data that is aligned with the second reference model by the machining region specifying unit 17.

The CAM device 72 obtains the machining path on the basis of the mesh model generated by the mesh generation device 71, and converts the machining path into the machining program to thereby generate the machining program. For generating the machining path and the machining program, the CAM device 72 can use data indicating a difference between the result of specification provided by the machining region specifying unit 17 and the second reference model, i.e., the model of the finished product. The cutting machining device 73 performs cutting machining in accordance with the machining program generated by the CAM device 72.

The additive manufacturing device 74 produces the manufactured product by adding a material melted by irradiation with a beam. The manufactured product produced by the additive manufacturing device 74 is conveyed to the cutting machining device 73.

The cutting machining device 73 cuts the manufactured product, i.e., the object to thereby produce the machined product. A peripheral device such as a device for monitoring the machined product at the time of cutting machining can be attached to the cutting machining device 73. FIG. 19 illustrates the cutting machining system 70 including the single cutting machining device 73. The cutting machining system 70 illustrated in FIG. 19 produces the machined product by cutting machining performed by the single cutting machining device 73. The cutting machining system 70 can include a plurality of the cutting machining devices 73, and produce the machined product by cutting machining performed by the plurality of the cutting machining devices 73.

Figure 20:
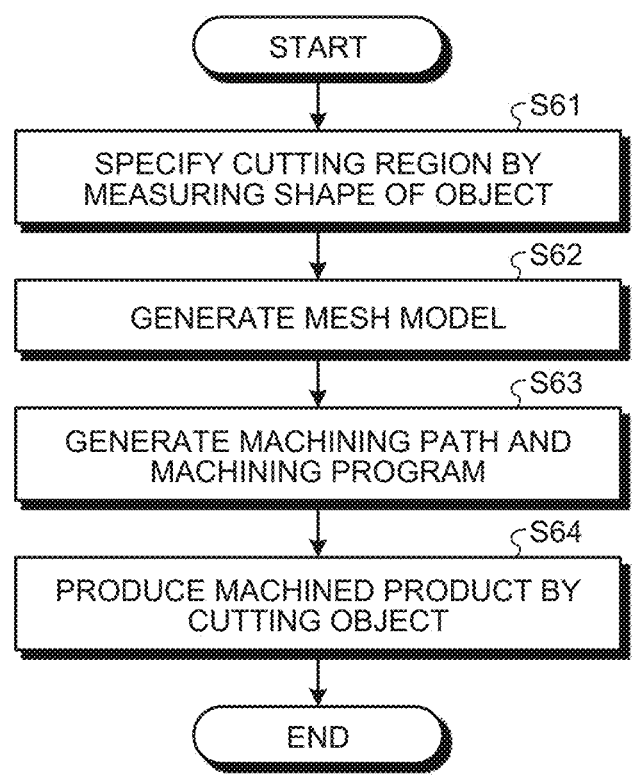
FIG. 20 is a flowchart illustrating an operation procedure of the cutting machining system according to the sixth embodiment.

Next, an operation of the cutting machining system 70 will be described. FIG. 20 is a flowchart illustrating an operation procedure of the cutting machining system 70 according to the sixth embodiment. In step S61, the measurement device 10 of the cutting machining system 70 measures the shape of the object to thereby specify the cutting region. The object is the manufactured product produced by the additive manufacturing device 74. The measurement device 10 specifies the cutting region through a procedure similar to the procedure illustrated in FIG. 4.

In step S62, the mesh generation device 71 of the cutting machining system 70 generates the mesh model of the cutting region specified in step S61. In step S63, the CAM device 72 of the cutting machining system 70 generates the machining path and the machining program on the basis of the mesh model generated in step S62.

In step S64, the cutting machining device 73 of the cutting machining system 70 cuts the object to thereby produce the machined product. After the above steps, the cutting machining system 70 ends the operation according to the procedure illustrated in FIG. 20.

According to the sixth embodiment, the cutting machining system 70, which includes the measurement device 10, can accurately specify the cutting region. The cutting machining system 70 can produce the machined product with high accuracy by accurately specifying the cutting region. Furthermore, by performing the process throughout from the measurement of the object up to the production of the machined product, the cutting machining system 70 can improve the efficiency of the setup work up to the production of the machined product. The cutting machining system 70 can shorten the period required for the setup work and can also reduce the cost required for the setup work. The cutting machining system 70 can reduce the period and cost required from the introduction of the cutting machining device 73 to the verification of the production of the machined product.

Note that in the cutting machining system 70, the object on which the cutting machining device 73 performs cutting machining is not limited to the manufactured product produced by the additive manufacturing device 74. In the cutting machining system 70, the cutting machining device 73 can produce the machined product by cutting the object other than the manufactured product produced by the additive manufacturing device 74. The cutting machining system 70 need only include at least the measurement device 10 and the cutting machining device 73. The cutting machining system 70 can be a cutting machining system that does not include the additive manufacturing device 74.

Seventh Embodiment

The mesh generation device 61 or 71 of the fifth or sixth embodiment can generate the mesh model, using a learning algorithm such as a neural network. A seventh embodiment will describe the mesh generation device 61 or 71 that generates the mesh model, using the neural network.

The neural network receives the result of specification provided by the machining region specifying unit 17 illustrated in FIG. 1, the result of specification being data indicating the addition region or data indicating the cutting region. For input data that is the data indicating the addition region or the data indicating the cutting region, the neural network outputs the mesh model based on a preset representation method. In a case where the data indicating the addition region is input to the neural network, the input data can be the three-dimensional point cloud data representing the addition region. In a case where the data indicating the cutting region is input to the neural network, the input data can be the measurement data aligned with the second reference model. A generative adversarial network (GAN) can be used as the neural network, for example.

High expressive power of the neural network enables the mesh generation device 61 or 71 to generate a mesh. The neural network can be expected to be more generic than a manually constructed mesh generation algorithm. This allows the mesh generation device 61 or 71 to generate the mesh model for the objects of various shapes or various sizes.

Note that the input data as training data input to the mesh generation device 61 or 71, and the network configuration of the mesh generation device 61 or 71 are not limited to those described in the seventh embodiment. The training data can be any piece of data. Moreover, any network configuration can be used for the mesh generation device 61 or 71.

The configurations illustrated in the above embodiments each illustrate an example of the content of the present disclosure. The configurations of the embodiments can be combined with another known technique. The configurations of the embodiments may be combined together as appropriate. A part of the configurations of the embodiments can be omitted or modified without departing from the scope of the present disclosure.

REFERENCE SIGNS LIST 10 measurement device; 11 measurement condition setting unit; 12 sensor; 13 measurement unit; 14 measurement data integrating unit; 15 missing region detecting unit; 16 measurement data complementing unit; 17 machining region specifying unit; 18 storage unit; 21 missing candidate point detecting unit; 22 contour extraction unit; 23 area calculation unit; 24 missing determination unit; 25 normal vector distribution calculating unit; 26 position/posture calculating unit; 27 re-measurement unit; 28 re-integration unit; 31 range adjustment unit; 32 measurement distance adjusting unit; 33 exposure time adjusting unit; 34 scene generation unit; 35 interference determination unit; 36 range decision unit; 37 point cloud count acquiring unit; 38 measurement distance deciding unit; 39 reflectance distribution acquiring unit; 40 data comparison unit; 41 exposure time deciding unit; 51 noise removal unit; 52 registration unit; 53 machining region deciding unit; 60 additive manufacturing system; 61, 71 mesh generation device; 62, 72 CAM device; 63, 74 additive manufacturing device; 70 cutting machining system; 73 cutting machining device; 80 processing circuitry; 81 input unit; 82 processor; 83 memory; 84 output unit.

The invention claimed is:

1. A measurement device comprising:
a sensor to acquire image information by imaging an object targeted for addition of materials or cutting;
measurement circuitry to acquire measurement data by measuring the shape of the object on the basis of the image information, the measurement data representing a shape of the object;
missing region detecting circuitry to detect a missing region of the object, the missing region being a region lacking the measurement data;
measurement data complementing circuitry to acquire re-measurement data, which is measurement data about the missing region, by re-measuring the shape of the object on the basis of the image information which the sensor has acquired by re-imaging, and complement the measurement data with the re-measurement data; and
machining region specifying circuitry to specify a machining region for the addition or the cutting, on the basis of the complemented measurement data and a model of a finished product obtained by the addition or the cutting.

2. The measurement device according to claim 1, wherein the missing region detecting circuitry includes:
missing candidate point detecting circuitry to detect a missing candidate point from the measurement data acquired by the measurement circuitry, the missing candidate point being a candidate for a point included in a contour of the missing region;
contour extraction circuitry to extract a contour including the missing candidate point from data on the missing candidate point;
area calculation circuitry to calculate an area of a region surrounded by the contour; and
missing determination circuitry to determine, on the basis of the calculated area, whether the region surrounded by the contour is the missing region.

3. The measurement device according to claim 1, wherein the measurement data complementing circuitry includes:
normal distribution calculating circuitry to calculate a normal distribution that is a distribution of directions of normals in the missing region detected by the missing region detecting circuitry;
position/posture calculating circuitry to calculate, on the basis of the normal distribution, a position or posture of the object or a position or posture of the sensor such that the sensor faces the object;
re-measurement circuitry to acquire the re-measurement data by re-measuring the shape of the object on the basis of the image information which the sensor has acquired by re-imaging after the position or posture of the object or the position or posture of the sensor is corrected; and
re-integration circuitry to integrate the re-measurement data into the measurement data.

4. The measurement device according to claim 1, further comprising
measurement condition setting circuitry to set a measurement condition for measurement by the measurement circuitry, wherein
the measurement condition setting circuitry includes:
range adjustment circuitry to adjust a range in which the object and the sensor are placeable when the image information is acquired;
measurement distance adjusting circuitry to adjust a measurement distance of the sensor; and
exposure time adjusting circuitry to adjust an exposure time of the sensor.

5. The measurement device according to claim 4, wherein the range adjustment circuitry includes:
scene generation circuitry to generate a simulated scene at the time of imaging of the object by placing the object, the sensor, and a structure around the object or the sensor in a virtual space;
interference determination circuitry to determine presence or absence of interference between the object or the sensor and the structure when at least one of a position of the object, a posture of the object, a position of the sensor, or a posture of the sensor is changed in the scene; and
range decision circuitry to decide the range in which the object and the sensor is placeable on the basis of a determination result provided by the interference determination circuitry.

6. The measurement device according to claim 4, wherein the measurement distance adjusting circuitry includes:
point cloud count acquiring circuitry to acquire a point cloud count for each measurement distance that is a distance from the object to the sensor, the point cloud count being the number of points included in three-dimensional point cloud data acquired by the sensor; and
measurement distance deciding circuitry to decide the measurement distance at the time of imaging of the object, on the basis of the point cloud count acquired for each measurement distance.

7. The measurement device according to claim 4, wherein the exposure time adjusting circuitry includes:
reflectance distribution acquiring circuitry to acquire a reflectance distribution of the object;
data comparison circuitry to compare the reflectance distribution with data on a reflectance distribution stored in advance; and
exposure time deciding circuitry to decide the exposure time on the basis of a comparison result provided by the data comparison circuitry.

8. The measurement device according to claim 1, wherein the machining region specifying circuitry includes:
noise removal circuitry to remove noise in the measurement data complemented by the measurement data complementing circuitry;
registration circuitry to perform registration between the model and the measurement data having the noise removed; and
machining region deciding circuitry to decide the machining region on the basis of the measurement data and the model between which the registration is performed.

9. An additive manufacturing system comprising:
an additive manufacturing device that is a machine tool to produce a manufactured product by addition of materials to an object; and
a measurement device to specify an addition region for the addition, by measuring a shape of the object, wherein
the measurement device includes:
a sensor to acquire image information by imaging the object;
measurement circuitry to acquire measurement data by measuring the shape of the object on the basis of the image information, the measurement data representing the shape of the object;
missing region detecting circuitry to detect a missing region of the object, the missing region being a region lacking the measurement data;
measurement data complementing circuitry to acquire re-measurement data, which is measurement data about the missing region, by re-measuring the shape of the object on the basis of the image information which the sensor has acquired by re-imaging, and complement the measurement data with the re-measurement data; and
machining region specifying circuitry to specify the addition region on the basis of the complemented measurement data and a model representing a machined shape.

10. The additive manufacturing system according to claim 9, further comprising:
mesh generation circuitry to generate a mesh model of the addition region specified by the machining region specifying circuitry; and
computer aided manufacturing circuitry to generate a machining program on the basis of the mesh model, wherein
the additive manufacturing device produces the manufactured product in accordance with the machining program.

11. The additive manufacturing system according to claim 10, wherein the mesh generation circuitry generates the mesh model, using a neural network that outputs the mesh model for input data representing the addition region specified by the machining region specifying circuitry.

12. A cutting machining system comprising:
a cutting machining device that is a machine tool to produce a machined product by cutting of an object; and
a measurement device to specify a cutting region for the cutting, by measuring a shape of the object, wherein
the measurement device includes:
a sensor to acquire image information by imaging the object;
measurement circuitry to acquire measurement data by measuring the shape of the object on the basis of the image information, the measurement data representing the shape of the object;
missing region detecting circuitry to detect a missing region of the object, the missing region being a region lacking the measurement data;
measurement data complementing circuitry to acquire re-measurement data, which is the measurement data about the missing region, by re-measuring the shape of the object on the basis of the image information which the sensor has acquired by re-imaging, and complement the measurement data with the re-measurement data; and
machining region specifying circuitry to specify the cutting region on the basis of the complemented measurement data and a model representing a machined shape.

13. The cutting machining system according to claim 12, further comprising:
mesh generation circuitry to generate a mesh model of the cutting region specified by the machining region specifying circuitry; and
computer aided manufacturing circuitry to generate a machining program on the basis of the mesh model, wherein
the cutting machining device produces the machined product in accordance with the machining program.

14. The cutting machining system according to claim 13, wherein the mesh generation circuitry generates the mesh model, using a neural network that outputs the mesh model for input data representing the cutting region specified by the machining region specifying circuitry.

15. The cutting machining system according to claim 12, further comprising
an additive manufacturing device that is a machine tool to produce a manufactured product by addition of materials, wherein
the measurement circuitry specifies the cutting region for the cutting, by measuring a shape of the manufactured product that is the object, and
the cutting machining device produces the machined product by cutting the manufactured product.

* * * * *